(12) United States Patent
Morikawa et al.

(10) Patent No.: US 7,884,957 B2
(45) Date of Patent: Feb. 8, 2011

(54) IMAGE FORMING APPARATUS AND IMAGE MANAGEMENT METHOD

(75) Inventors: Takeshi Morikawa, Takarazuka (JP); Masaya Hashimoto, Amagasaki (JP); Nobuhiro Mishima, Osaka (JP); Takeshi Minami, Amagasaki (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1087 days.

(21) Appl. No.: 11/237,899

(22) Filed: Sep. 29, 2005

(65) Prior Publication Data

US 2007/0008572 A1 Jan. 11, 2007

(30) Foreign Application Priority Data

Jul. 8, 2005 (JP) .............................. 2005-199751

(51) Int. Cl.
*G06F 3/12* (2006.01)
*H04N 1/60* (2006.01)
*G06K 15/00* (2006.01)

(52) U.S. Cl. ....................... 358/1.15; 358/1.9; 358/1.14
(58) Field of Classification Search .................. 358/1.1, 358/1.9, 1.11–1.18
See application file for complete search history.

(56) References Cited

U.S. PATENT DOCUMENTS

| 5,149,140 | A | | 9/1992 | Mowry, Jr. et al. |
| 5,390,003 | A | * | 2/1995 | Yamaguchi et al. ......... 399/366 |
| 5,909,602 | A | * | 6/1999 | Nakai et al. ..................... 399/8 |
| 6,256,110 | B1 | | 7/2001 | Yoshitani |
| 6,414,757 | B1 | | 7/2002 | Salem |
| 6,515,762 | B2 | | 2/2003 | Noguchi |
| 2002/0042884 | A1 | * | 4/2002 | Wu et al. .................... 713/201 |
| 2002/0105675 | A1 | | 8/2002 | Toyofuku |
| 2006/0007500 | A1 | * | 1/2006 | Abe et al. ................... 358/401 |
| 2006/0279761 | A1 | * | 12/2006 | Wang et al. ................ 358/1.14 |

FOREIGN PATENT DOCUMENTS

| JP | 11-091198 | | 4/1999 |
| JP | 2001-218042 | | 8/2001 |
| JP | 2001218042 | A * | 8/2001 |

(Continued)

OTHER PUBLICATIONS

Notification of Reason(s) for Refusal in JP 2005-199751 dated Feb. 12, 2008, and Translation thereof.

(Continued)

*Primary Examiner*—Thierry L Pham
(74) *Attorney, Agent, or Firm*—Buchanan Ingersoll & Rooney PC

(57) ABSTRACT

The present invention provides an image forming apparatus, an image management method and an image management program in which a security of image data to which anti-counterfeit information and the like is added can be ensured. The image forming apparatus connected to the network has an image data forming unit which forms the image data, and a control unit which prohibits transference of anti-counterfeit added image data in which the anti-counterfeit information is added to the image data between devices connected to the network. Thus, since the transference of the anti-counterfeit added image data is prohibited in general, security of the anti-counterfeit added image data can be improved.

19 Claims, 10 Drawing Sheets

FOREIGN PATENT DOCUMENTS

| | | |
|---|---|---|
| JP | 2001-265656 | 9/2001 |
| JP | 2002-077571 | 3/2002 |
| JP | 2002-229762 | 8/2002 |
| JP | 2002-312136 | 10/2002 |
| JP | 2003-337687 | 11/2003 |
| JP | 2004-078752 | 3/2004 |
| JP | 2004-152005 | 5/2004 |
| JP | 2004-200897 | 7/2004 |

OTHER PUBLICATIONS

Notification of Reason(s) for Refusal in JP 2005-199751 dated May 13, 2008, and English Translation thereof.

\* cited by examiner

Fig.5

| USER NAME (61) | FILE NAME (62) | FILE ATTRIBUTE (63) | ANTICOUNTERFEIT EXPIRATION DATE (64) | JOB KIND (65) |
|---|---|---|---|---|
| A | CONTROL SPECIFICATION.doc | GENERAL DOCUMENT | — | PRINT |
| B | TEST.doc | GENERAL DOCUMENT | — | COPY |
| C | ESTIMATION SHEET.doc | ANTICOUNTERFEIT ADDED DOCUMENT | 2005/12/31 | PRINT |

| USER NAME (71) | PASSWORD (72) | ANTICOUNTERFEIT ADDED DATA ACCESS AUTHORIZATION (73) |
|---|---|---|
| A | 4A567123 | PROHIBITION |
| B | AB4RE671 | PROHIBITION |
| C | 268DFDB | PERMISSION |

7

IMAGE FORMING APPARATUS AND IMAGE MANAGEMENT METHOD

This application is based on an application No. 2005-199751 filed on Jul. 8, 2005 in Japan, the contents of which is hereby incorporated by reference.

BACKGROUND OF THE INVENTION

1. Field of the Invention

The present invention relates to an image forming apparatus, and an image management method and an image management program performed in the image forming apparatus. More particularly, the present invention relates to an image forming apparatus connected to a network and comprising, for example, a function to add anti-counterfeit information an image management method and an image management program performed in that image forming apparatus.

2. Description of the Related Art

Recently, a copying machine which uses an electrophotographic technique has been widely spread and thus, a character or an image printed on paper and the like can be easily copied using the copying machine. Especially, a repro which is very hard to distinguish from an original can be easily formed using a recent color digital copying machine (MFP, for example). Therefore, it becomes important to take measures to prevent a printed material such as an important document from being counterfeited, falsified and illegally copied.

As the prevention measures against the counterfeit, the falsification, and the illegal copying, there is a method in which a latent image which cannot be recognized with eyes appears when some means and operation are applied to the printed material using a pattern comprising multiple geometric patterns as a design. Its representative example is a pattern such as a tint block, a guilloche pattern, a relief pattern and the like (referred to as the "tint block" hereinafter) widely used in printed securities. For example, when the document which is to be prevented from being copied such as an important document or a secret document is printed, a tint block comprising a latent image and a tint block pattern are combined therein. Since the latent image and the tint block pattern are printed at almost the same level of concentrations, the latent image cannot be recognized with eyes in this printed material. However, when this printed material is scanned by the copying machine, the tint pattern is erased by using a function of a base removing process such as a reading resolution limit of the scanner and as a result, the latent image such as characters like "copied material" appears in the outputted repro. Thus, although the latent image such as "copied material" is hidden in the original, when it is scanned, the tint block pattern is erased and the latent image appears, so that the original is distinguished from the copied material to prevent the information from being leaked or to track leakage of the information. The above technique is used in general.

Thus, when the anti-counterfeit information such as the tint block is combined with the image to be outputted, it is important that the anti-counterfeit information is hidden in the original and the anti-counterfeit effect appears at the time of scanning in view of security of the image. In order to implement the above, it is necessary to perform a process corresponding to the characteristics of the image forming apparatus which forms the original printed material. Thus, Japanese Unexamined Patent Publication No. 2002-77571 discloses a technique in which in a system comprising a first LAN having a server which manages data exchange with a database, and a second LAN having a terminal and a printer, the first and second LANs being connected through a communication line and the Internet, the server holds anti-counterfeit information such as the tint block corresponding to the output characteristics of each printer, and the anti-counterfeit information such as the tint block corresponding to the printer is combined at the time of printing by the printer and the like. In addition, Japanese Unexamined Patent Publication No. 2004-78752 discloses a printing control method implemented in a system in which a host device for an administrator and a host device for a user are connected through a network wherein the administrator determines whether a tint block is printed or not.

However, in order to make the tint block appear, a process which corresponds to the output characteristics of the copying machine is needed as described above. Therefore, when image information is transferred from an image forming apparatus to another image forming apparatus through the network, there is a case where anti-counterfeit information cannot be correctly formed in the other image forming apparatus.

In addition, according to the technique disclosed in Japanese Unexamined Patent Publication No. 2002-77571, since it is necessary to previously prepare and hold the anti-counterfeit information such as the tint block corresponding to the output characteristics of each printer, there is a problem that the device constitution becomes complicated. Similarly, according to the technique disclosed in Japanese Unexamined Patent Publication No. 2004-78752, when the printing instruction is given from the host device for the user to the printer, it is necessary to send inquiries to the host device for the administrator about the management information such as a host name, a user name and the like every time, so that there is a problem that the control becomes complicated.

SUMMARY OF THE INVENTION

The present invention was made to solve the above problems and it is an object of the present invention to provide an image forming apparatus in which security of image data to which image attribute information such as anti-counterfeit information is added is highly provided and an image management method performed in the above image forming apparatus.

In order to attain the above objects, the present invention is constituted as follows.

That is, according to a first aspect of the present invention, there is provided a first image forming apparatus connected to a network, which comprises:

an image data forming unit configured to form image data; and a control unit configured to prohibit at least one of transference of attribute information added image data in which image attribute information is added to the image data from the first image forming apparatus to another device connected to the network and a browse of the attribute information added image data from the other device.

In addition, according to a second aspect of the present invention, there is provided a first image forming apparatus connected to a network, which comprises:

an information adding unit configured to add image attribute information to image data and form attribute information added image data when addition of the image attribute information to the image data is executed; and a treatment permission/non-permission determining unit configured to determine whether treatment of the attribute information added image data between the first image forming apparatus and another device connected to the network is permitted or not depending on whether the image data is the attribute information added image data or not.

Furthermore, according to the second aspect of the present invention, the image forming apparatus may be designed so that the apparatus further comprises a storing unit configured to classify the image data into the attribute information added image data and general image data in which the attribute information added image data is not added and store the attribute information added image data and general image data; wherein the treatment permission/non-permission determining unit determines whether the treatment is permitted or not depending on the classification.

In addition, according to the second aspect of the present invention, the image forming apparatus may be designed so that the treatment permission/non-permission determining unit includes a device discriminating unit configured to determine whether the other device is a second image forming apparatus or not and determine whether a printer which can print the image attribute information is provided in the second image forming apparatus or not when the other device is the second image forming apparatus, and determine whether the treatment is permitted or not depending on the presence or absence of the printer.

Still furthermore, according to the second aspect, the image forming apparatus may be designed so that the storing unit further includes an access right storing unit configured to store an access right showing permission or non-permission of access to the attribute information added image data every user.

Still furthermore, according to the second aspect, the image forming apparatus may be designed so that the storing unit further includes a time limit storing unit configured to store a non-permission time limit in which the access to the attribute information added image data is not permitted every attribute information added image data.

Still furthermore, according to the second aspect, the image forming apparatus may be designed so that the device discriminating unit includes an ID determining unit configured to determine whether a manufacturer ID and a device type ID of the first image forming apparatus coincide with an manufacturer ID and a device type ID of the second image forming apparatus, respectively or not, and the treatment permission/non-permission determining unit determines whether the treatment is permitted or not depending on the coincidence or non-coincidence of the IDs.

According to a third aspect of the present invention, there is provided an image management method comprising:

forming image data;

forming attribute information added image data by adding image attribute information to the image data when addition of the image attribute information to the image data is executed; and determining whether treatment of the attribute information added image data between a first image forming apparatus and another device connected to the network is permitted or not depending on whether the image data is the attribute information added image data or not.

According to the image forming apparatus in the first and second aspects and the image management method in the third aspect, when the addition of the image attribute information corresponding to the anti-counterfeit information and the like to the image data is executed, the attribute information added image data to which the image attribute information is added is formed and it is determined whether the treatment of the attribute information added image data is permitted or not depending on whether the image data is the attribute information added image data or not. Thus, the treatment of the attribute information added image data between the first image forming apparatus and the other device connected through the network, for example, prohibition of transference of the attribute information added image data from the first image forming apparatus to the other device or prohibition of the browse of the attribute information added image data from the other device or the like can be determined only by depending on whether the image data is the attribute information added image data or not. Therefore, operability of the image forming apparatus connected to the network is not damaged. Furthermore, the attribute information added image data is not transferred between the first image forming apparatus in which the attribute information added image data is stored and the other device in principle and only when specific condition is satisfied, the transference and the like is permitted. Thus security of the attribute information added image data stored in the image forming apparatus connected to the network can be easily ensured and the security of the attribute information added image data can be improved as compared with the conventional examples.

Since the image forming apparatus comprises the storing unit and the attribute information added image data and the general image data are classified and stored to the storing unit, the determination whether the image data is the attribute information added image data or not can be easily made.

In addition, when the other device connected to the network is the second image forming apparatus and it has a printer which can print the image attribute information, it is so constituted that the attribute information added image data can be transferred and the like. According to this constitution also, the security of the attribute information added image data stored in the first image forming apparatus connected to the network can be ensured and improved.

Furthermore, when the access to the attribute information added image data is permitted or the access non-permission time limit is expired, it is so constituted that the attribute information added image data can be transferred and the like. According to this constitution also, the security of the attribute information added image data stored in the first image forming apparatus connected to the network can be further surely ensured and improved.

Still furthermore, when the IDs of the first image forming apparatus and the second image forming apparatus connected to the network coincide with each other, it is so constituted that the transference, etc. of the attribute information added image data is permitted. According to this constitution also, the security of the attribute information added image data stored in the first image forming apparatus connected to the network can be further surely ensured and improved.

BRIEF DESCRIPTION OF THE DRAWINGS

FIG. 5 is a view showing a constitution example of a file stored in the hard disk of the image forming apparatus shown in FIG. 1;

FIG. 6 is a view showing an example of a user information database stored in the hard disk of the image forming apparatus shown in FIG. 1;

DETAILED DESCRIPTION OF THE PREFERRED EMBODIMENTS

Figure 1:
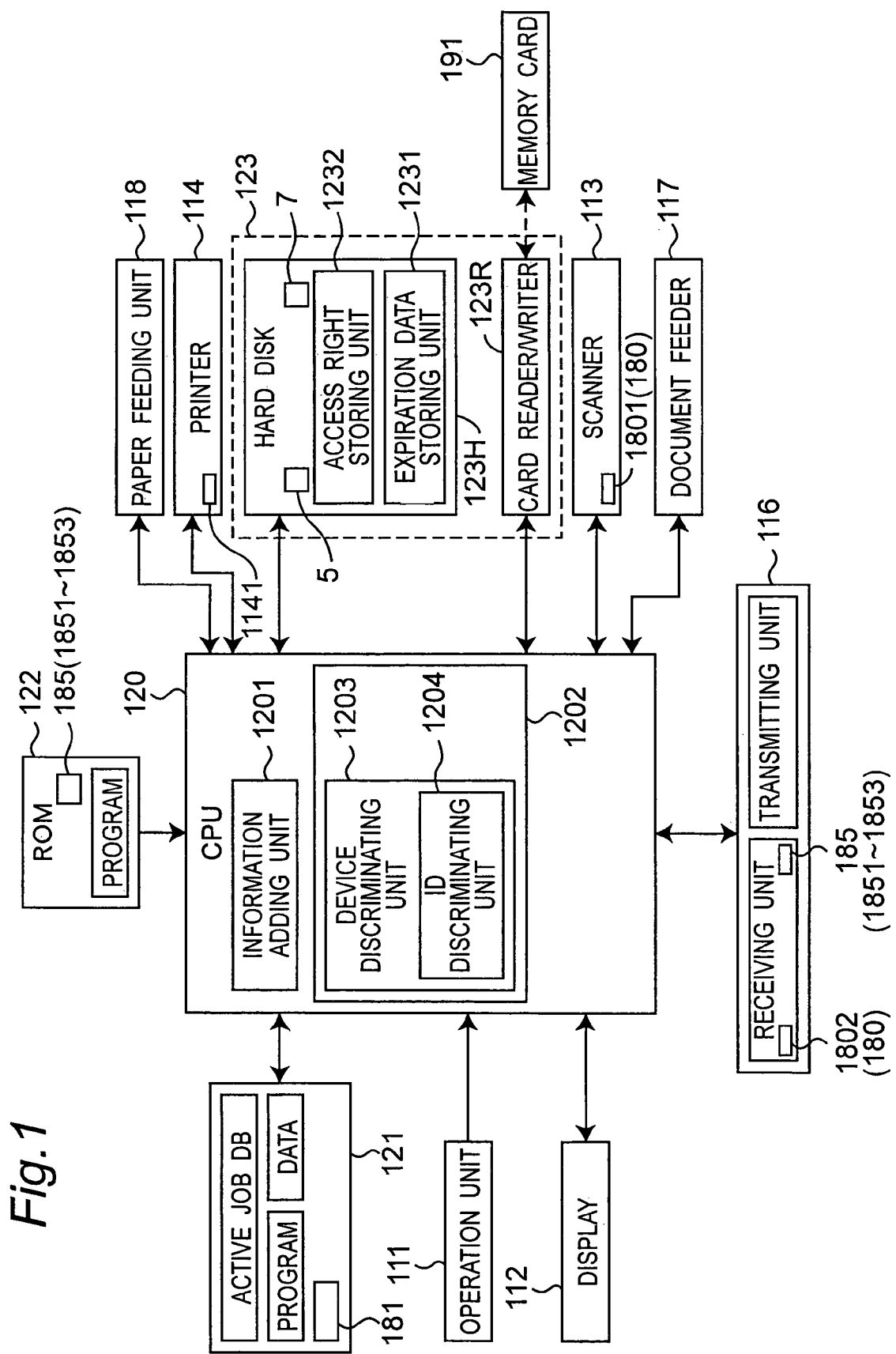
FIG. 1 is a block diagram showing a constitution of an image forming apparatus according to an embodiment of the present invention.

An image forming apparatus, a image management method and an image management program performed in the image forming apparatus will be described with reference to the drawings hereinafter. In addition, the same reference numerals are allotted to the same components in the drawings.

A term "image" in this specification and claims includes not only a picture but also a document comprising characters because the character is also an image formed of dots.

In addition, although a term "image attribute information" is an example of information for preventing forgery of image data by an embedded pattern using a latent image, a tint block pattern and the like in the following embodiment, the present invention is not limited to the above, and it also includes information for preventing a browse or for copy history and includes information like a flag which is not the information for preventing forgery itself and shows that the above information for preventing forgery is added to the image data. That is, the "image attribute information" has a concept including information for showing an attribute regarding the image data. In addition, when the image attribute information comprises the information like the flag, the anti-counterfeit information added to the image data and the like are separately stored.

Figure 2:
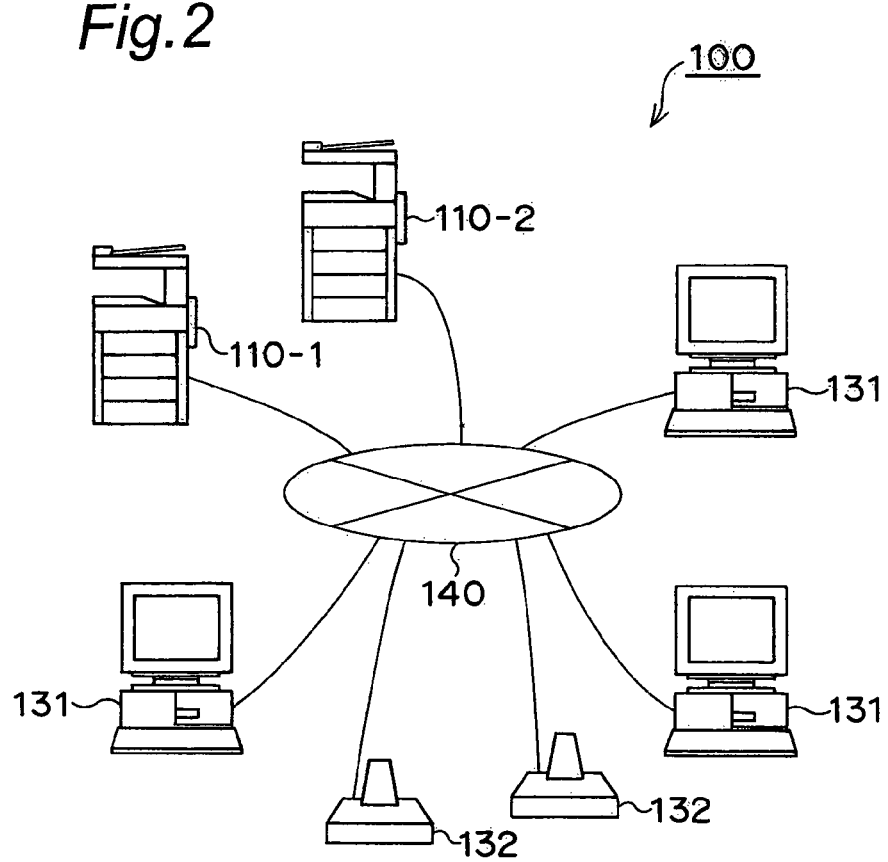
FIG. 2 is a view showing an example of a file sharing system comprising the image forming apparatus shown in FIG. 1.

FIG. 2 shows an example of a whole constitution of a file sharing system (FS) 100 comprising the image forming apparatus. The file sharing system 100 comprises one or more image forming apparatuses 110, one or more personal computers 131, one or more FAX terminals 132, a communication line 140, and the like. The communication line 140 is also called a network herein. When there are plural number of image forming apparatuses 110, a first image forming apparatus 110-1 which is a main one and forms original image data is discriminated from one or more other subordinate second image forming apparatuses 110-2. The first image forming apparatus 110-1 and the second image forming apparatus 110-2 are generically called the image forming apparatus 110. Device names such as "PC001", "PC002", . . . are allotted to the image forming apparatuses 110 and the personal computers 131 to identify them. Instead of those device names, IP address may be used as identification information. A telephone number of a fixed phone or an IP phone and the like is allotted to the FAX terminal(s) 132.

The first image forming apparatus 110-1, the second image forming apparatus 110-2, the personal computer 131, and the FAX terminal 132 can be connected to each other through the communication line 140. As the communication line 140, a LAN, the Internet, a private line or a public line are used. As a protocol or a communication standard, TCP/IP (Transmission Control Protocol/Internet Protocol), FTP (File Transfer Protocol), POP3 (Post Office Protocol version 3), SMTP (Simple Mail Transfer Protocol), IPP (Internet Printing Protocol), IEEE802.3 which is a standard of a fixed-line LAN, IEEE802.11 which is a standard of a wireless LAN, and G3 (Group 3) standard or G4 (Group 4) standard of a FAX can be used.

According to the file sharing system 100, a user can share the image data of a file stored in a hard disk in the first image forming apparatus 110-1 with the second image forming apparatus 110-2 and the personal computer 131. Instead of the personal computer 131, a workstation, a PDA (Personal Digital Assistant) or a mobile phone terminal may be used.

Figure 3:
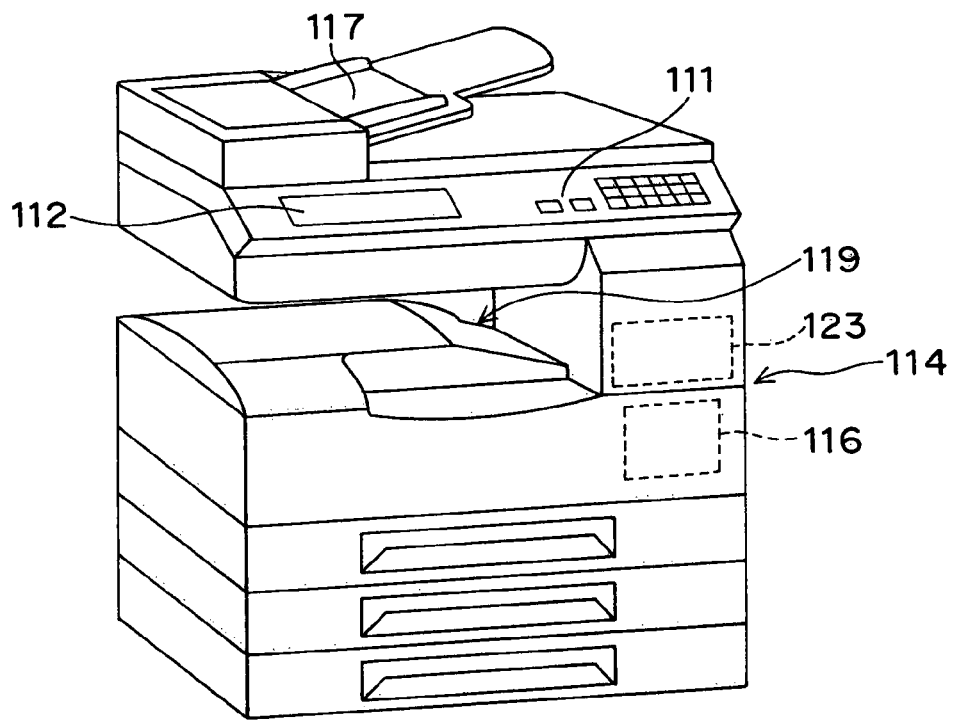
FIG. 3 is a perspective view showing the image forming apparatus shown in FIG. 1.

The image forming apparatus 110 is a device for forming an image on a recording sheet such as paper and, in this embodiment, it is a device called as a complex device or an MFP (Multi Function Peripheral) in which functions such as copying, network printing, scanning, faxing, document serving and the like are integrated. That is, the image forming apparatus 110 comprises an operation unit 111, a display 112, a scanner 113, a printer 114, an communication interface 116, a document feeder 117, a paper feeding unit 118, a tray 119, a CPU 120, a RAM 121, a ROM 122, a data storing unit 123, and the like as shown in FIGS. 1 and 3.

The operation unit 111 comprises a plurality of keys to input a numeral, a character, a symbol, and the like, a sensor to recognize a pressed key, and a transmission circuit to transmit a signal showing the recognized symbol to the CPU 120.

The display 112 is a unit on which information to send a message or an instruction to the user, information to input setting contents and processed contents by the user, and information showing an image formed by the image forming apparatus 110 and a processed result are displayed so as to be visible. According to this embodiment, a touch panel type is used as the display 112. Therefore, the display 112 comprises a function to detect a position on the touch panel touched by a finger of the user and to transmit a signal showing the detected result to the CPU 120.

Thus, the operation unit 111 and the display 112 serve as a user interface through which the user directly operates the image forming apparatus 110. In addition, an application program and a driver to give an instruction to the image forming apparatus 110 are installed in the personal computer 131. Therefore, the user can operate the image forming apparatus 110 by remote control using the personal computer 131.

The scanner 113 photoelectrically reads an image such as a photograph, a character, a picture, a graph and the like drawn in an original and generates digital image data, that is, concentration data showing a concentration of RGB or black in this embodiment. Thus, the scanner 113 serves as an image reading unit in the complex device. Thus provided image data 1801 is printed by the printer 114 or converted to a file with a format such as TIFF (Tagged Image File Format) or PDF (Portable Document Format) and stored in the data storing unit 123 or transmitted to the personal computer 131, or converted to FAX data and transmitted to the FAX terminal 132. In addition, the scanner 113 and the printer 114 serve as an example of an image data forming unit.

The document feeder 117 is provided at an upper part of a body of the image forming apparatus 110 and used to sequentially send one or more originals to the scanner 113.

The printer 114 prints an image of the image data 1801 read by the scanner 113, an image of image data transmitted from the personal computer 131, and an image of FAX data transmitted from the FAX terminal 132, on a recording sheet such as a sheet or a film. The paper feeding unit 118 is provided at a lower part of the body of the image forming apparatus 110 and used to supply the recording sheet suitable for the image to be printed to the printer 114. The recording sheet, that is, the printed material on which the image is printed by the printer 114 is discharged to the tray 119. In addition, the printer 114 has an information adding function 1141 to add anti-counterfeit data corresponding to an example of the image attribute information to the recording sheet. On the anti-counterfeit added document, an anti-counterfeit pattern such as "NO COPYING" or "NO EFFECT", etc. is combined into the image data 180, and the combined data is printed.

The communication interface 116 comprises a transmitting unit, a receiving unit and the like, through which data is exchanged with the second image forming apparatus 110-2, the personal computer 131 and the FAX terminal 132. As the communication-interface 116, a NIC (Network interface Card), a modem, a TA (Terminal Adapter) or the like is used.

The data storing unit 123 comprises a hard disk 123H and a card reader/writer 123R and the like. The card reader/writer 123R reads data from a memory card 191 such as a compact flash (registered trademark) or a smart media or write data in the memory card 191. The memory card 191 is used to exchange data with personal computer 131 without using the communication line or to back up data mainly.

Figure 4:
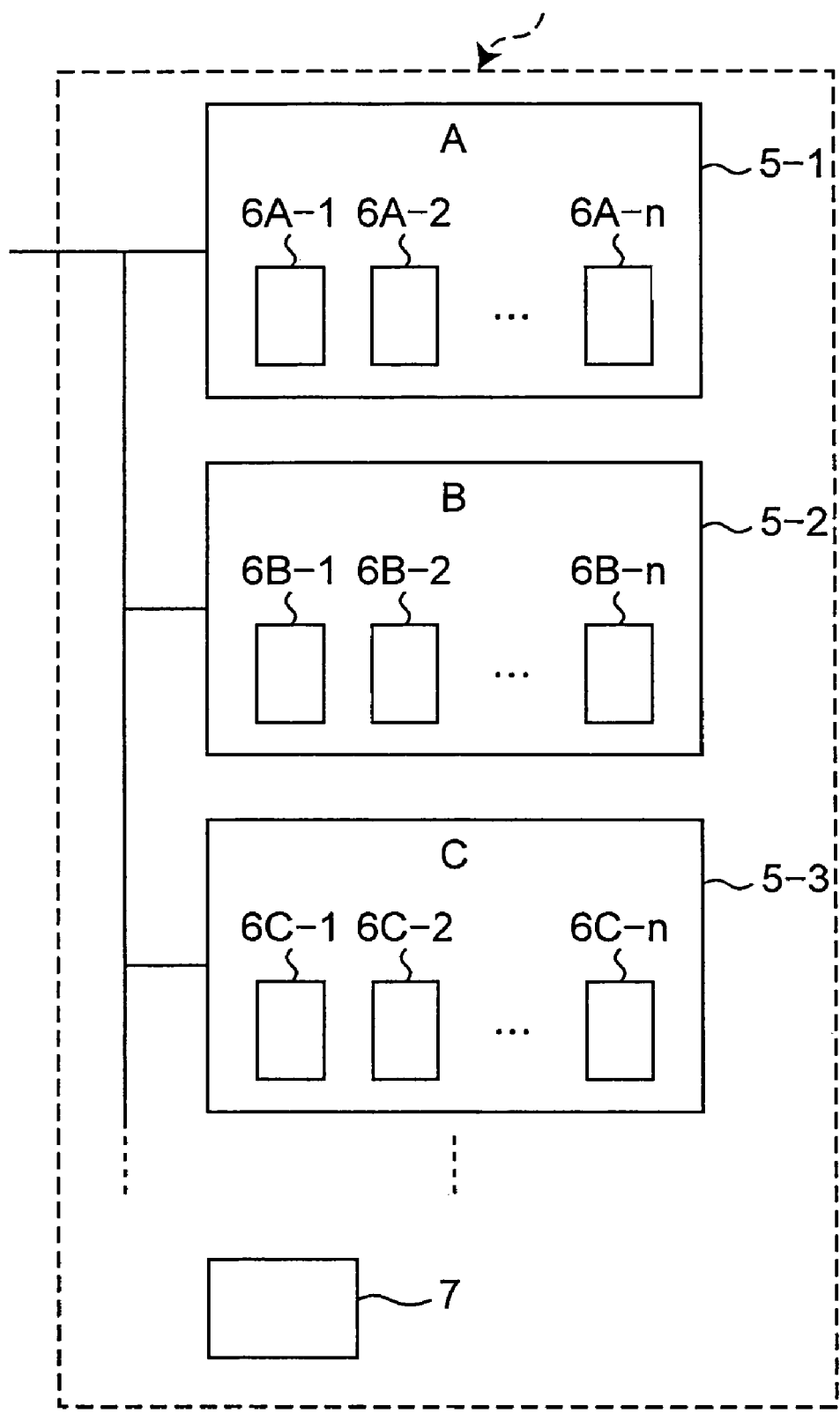
FIG. 4 is a view showing an example of a box provided in a hard disk of the image forming apparatus shown in FIG. 1.

As shown in FIG. 4, a personal box which is a storage region to store data of the user as a file 6 is allocated to every user in the hard disk 123H. In addition, the files 6A-1, 6B-1, 6C-1, . . . shown in FIG. 4 are generically called the file 6. The personal box corresponds to a "directory" or "folder" in the personal computer or the work station. The personal box is referred to as a "box 5" hereinafter. As described above, since the box 5 is allocated to every user, box names are given with corresponding to the boxes 5-1, 5-2, 5-3, . . . so as to be identified. In this embodiment, a name of the user who is the owner of the box is used as the box name.

Each user can store the file 6 in the box 5 of user's own in the image forming apparatus 110 by transferring the file from the personal computer 131. Alternatively, each user can store the file 6 in the box 5 of user's own by setting the memory card 191 in which the file 6 is stored in a slot of the card reader/writer 123 and copying the file 6. Other than the above, the file 6 can be stored in the box 5 in the following cases.

For example, when the user instructs the first image forming apparatus 110-1 to copy the original set in the document feeder 117, the first image forming apparatus 110-1 converts the image data 1801 of the image (a document, a drawing, a photograph and the like) read from the original to the file 6 and stores it in the box 5 of the user's own. In addition, when the instruction to transmit the image data 1801 of the image of the original set in the document feeder 117 to the personal computer 131 is given, similarly, the image data 1801 of the read image is converted to the file 6 and it is stored in the box 5 of the user's own. Alternatively, when an instruction to print a document is given by the user from the personal computer 131 of the user (network printing) to the first image forming apparatus 110-1, image data 1802 of the document transmitted from the personal computer 131 is stored in the box 5 of the user's own as the file 6. Alternatively, when FAX data is transmitted from the FAX terminal 132 to the first image forming apparatus 110-1, the first image forming apparatus 110-1 stores the FAX data as the file 6 in the box 5 of the user who received the FAX data. When an instruction which represents to transmit the image of the original set in the document feeder 117 of the first image forming apparatus 110-1 to the FAX terminal 132 is given to the first image forming apparatus 110-1 by the user, the image data 1801 of the read image is converted to the file 6 and it is stored in the box 5 of the user's own.

In addition, the image data such as the above-described image data 1801 and 1802 in which the image attribute information is selectively added is generically called the image data 180. Here, the image attribute information corresponds to an example of a "file attribute" as will described below, which is the anti-counterfeit information of the image data in this embodiment. The image attribute information is stored in, for example the RAM 121 as the image attribute information 181 as shown in FIG. 1, and the image attribute information is added to the image data 180 according to the control by the CPU 120 as will be described below. Thus, the image data 180 is formed as attribute information added image data 182. In addition, as described above, the image attribute information 181 is not limited to the anti-counterfeit information.

The file 6 to be stored in the box 5 has information of a "user name" 61, a "file name" 62, a "file attribute" 63, an "anti-counterfeit expiration date" 64, and a "job kind" 65 in this embodiment as shown in FIG. 5, and pieces of information 61 to 65 are stored in storing units corresponding to the individual pieces of information 61 to 65 in the box 5 recorded in the hard disk 123H in the data storing unit 123 of the first image forming apparatus 110-1. For example, the information of the anti-counterfeit expiration date 64 is stored in an expiration date storing unit 1231 shown in FIG. 1. In addition, the anti-counterfeit expiration date 64 is not an indispensable component among the components constituting the file 6. In addition, another component may be added to the file 6.

The file name 62 is identification information to identify the plurality of files 6 stored in the same box 5. Therefore, although the file 6 having the same file name cannot be stored in the same box 5, the file having the same file name can be stored in another box.

The file attribute 63 is the information to classify the contents of the image data 180 such as a document, etc. which constitutes each file 6. More specifically, the file attribute 63 is the information classified depending on whether the image attribute information 181 is added to the image data 180 or not. According to this embodiment, since the anti-counterfeit information of the image data 180 is illustrated as the image attribute information 181, as the file attribute 63, there are an "anti-counterfeit added document" in which the anti-counterfeit information 181 is contained and a "general document" to which the anti-counterfeit information 181 is not added. Here, the "anti-counterfeit added document" corresponds to an example of the attribute information added image data 182. In addition, the "general document" to which the anti-counterfeit information 181 is not added corresponds to general image data 183. Thus, each file 6 is classified also by the file attribute 63 and stored in the box 5 recorded in the hard disk 123H in the data storing unit 123 of the first image forming apparatus 110-1.

The anti-counterfeit expiration date 64 is effective only when the file attribute 63 is the "anti-counterfeit added document" and the anti-counterfeit expiration date 64 is the information of the expiration date showing until when the anti-counterfeit information 181 is added. More specifically, the anti-counterfeit expiration date 64 is information of a date. In addition, since the anti-counterfeit information of the image data 180 is illustrated as the image attribute information 181 in this embodiment, a term "anti-counterfeit expiration date" is used. Thus, the anti-counterfeit expiration date 64 corresponds to an example of a time limit which does not permit access to the attribute information added image data 182 to which the image attribute information 181 is added. The "anti-counterfeit expiration date", that is, the information of the non-permission time limit is stored in an expiration date storing unit 1231 in the box 5 in which each file 6 is stored.

The job kind 65 is information showing a process to be performed by the file 6. That is, a value of the job kind 65 is decided by how the instruction is given by the user and how the file 6 is stored in the box 5.

In addition, a user information database 7 is stored in the hard disk 123H as shown in FIG. 4. As shown in FIG. 6, information regarding the user who uses the first image forming apparatus 110-1 is stored in the user information database 7. A "user name" 71 is an identification information to identify the user. The user name 71 is used when the user logs in to the first image forming apparatus 110-1, for example. A "password" 72 is information for authorizing the user (confirming the user) when the user logs in. An "anti-counterfeit added data access authorization" 73 is information corresponding to access authorization showing whether the user can access the attribute information added data 182 to which the image attribute information 181 is added or not. When the anti-counterfeit added data access authorization 73 is in "permission", the above anti-counterfeit added document, that is, the attribute information added image data 182 can be operated, on the other hand it is in "prohibition", the above anti-counterfeit added document, that is, the attribute information added image data 182 cannot be operated, so that only the general document, that is, the general image data 183 is operated. The access authorization 73 of the anti-counterfeit added data is previously registered by an administrator of the first image forming apparatus 110-1 for every user, so that security of the first image forming apparatus 110-1 is improved. In addition, the access authorization 73 is stored in an access right storing unit 1232 in the box 5 storing each file 6.

The CPU functions as a control unit and executes a program stored in the ROM 122 or a program which is loaded to the RAM 121 to control an entire operation of the first image forming apparatus 110-1. Here, a management program of the image data 180 as will be described below with reference to FIGS. 7 to 12 is contained in the above program.

In addition, as will be described with reference to FIGS. 7 to 12, the CPU 120 controls the treatment of the image data 180, especially the attribute information added image data 182. The CPU 120 comprises the following components so that the treatment control is performed.

That is, as shown in FIG. 1, the CPU 120 comprises an information adding unit 1201, a treatment permission/non-permission determining unit 1202, a device discriminating unit 1203, and an ID discriminating unit 1204, and performs at least one operation of transferring the attribute information added image data 182 from the first image forming apparatus 110-1 to another device connected to the network 140 and for bidding a browse of the attribute information added image data 182 from the another device.

The information adding unit 1201 is a unit in which the image attribute information 181 is added to the image data 180 to form the attribute information added image data 182 when the addition of the image attribute information 181 to the image data 180 is selected. The user selects whether the image attribute information 181 is added to the image data 180 or not, for example, when a document is read by the scanner 113 to form the image data 180 according to the user's instructions. When the user selects the addition of the image attribute information 181, the image attribute information 181 is added to the image data 180 by the information adding unit 1201. In addition, the image attribute information 181 corresponds to the anti-counterfeit information of the image data using the tint block, for example as described above.

The treatment permission/non-permission determining unit 1202 is a unit determining whether treatment of the attribute information added image data 182 is allowed or not between the first image forming apparatus 110-1 and the other devices 110-2, 131 or the like connected to the network 140 depending on whether the image data 180 is the attribute information added image data 182 or not. The term "treatment" corresponds to a process such as transferring process of the image data from the first image forming apparatus 110-1 to other devices connected to the network 140, or the browsing process of the image data from other devices to the first image forming apparatus 110-1, for example.

The device discriminating unit 1203 is included in the treatment permission/non-permission determining unit 1202 and is a unit determining whether the other devices 110-2, 131 and the like correspond to the second image forming apparatus 110-2 or not. When the other devices correspond to the second image forming apparatus 110-2, the device discriminating unit 1203 determines whether a printer which can print the image attribute information 181 is installed or not in the second image forming apparatus 110-2.

The ID, discriminating unit 1204 is included in the device discriminating unit 1203 and is a unit determining whether a manufacturer ID and a device type ID of the first image forming apparatus 110-1 having the device discriminating unit 1203 coincide with a manufacturer ID and a device type ID of the second image forming apparatus 110-2, respectively or not.

Descriptions will be made of an operation of the first image forming apparatus 110-1 having the above constitution, that is, the entire operation of the first image forming apparatus 110-1 controlled by the CPU 120, and especially a treatment method of the attribute information added image data 182, that is, a management method of the image data 180 with reference to FIGS. 7 to 12.

Figure 7:
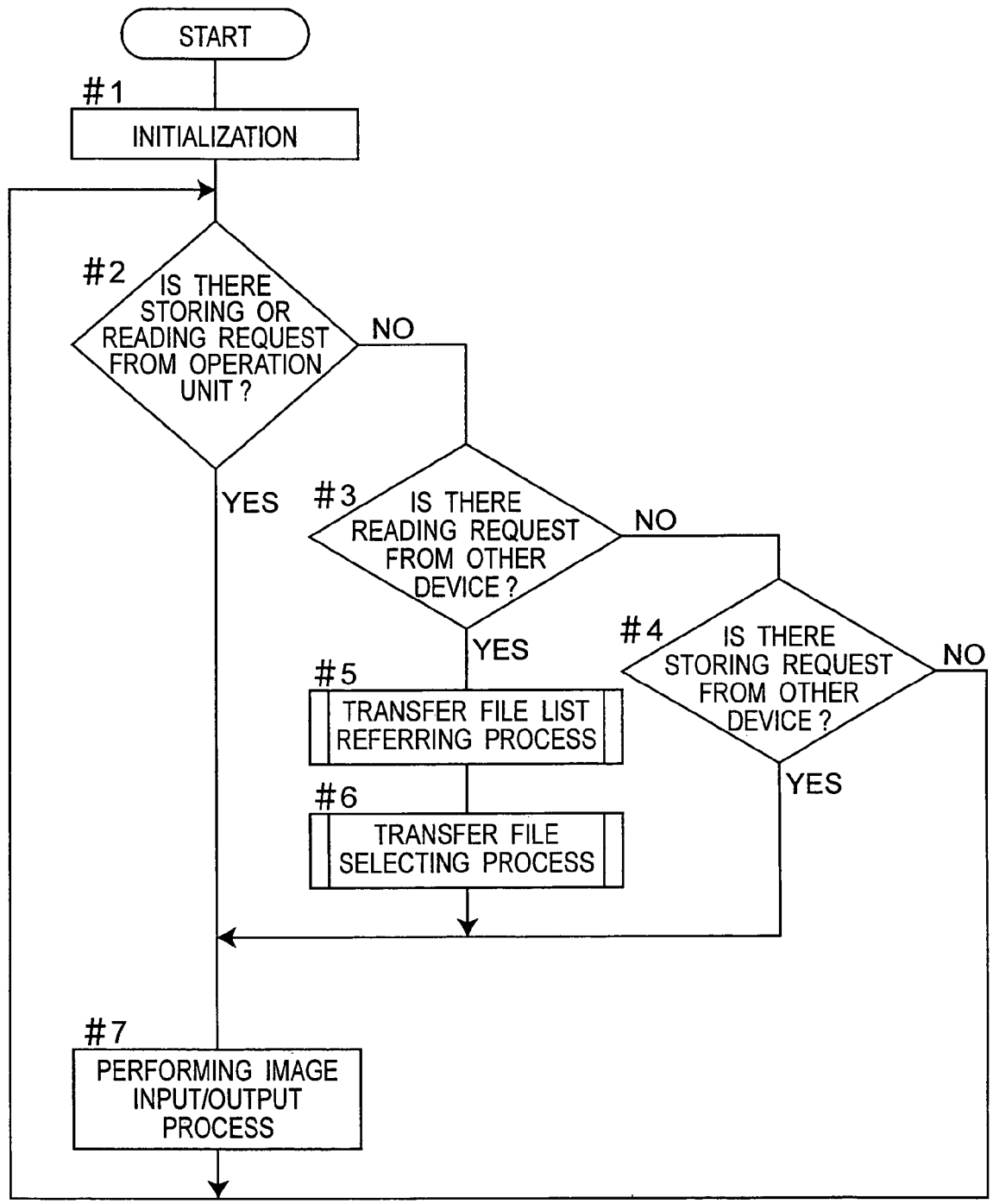
FIG. 7 is a flowchart to explain a flow of processes performed by the image forming apparatus shown in FIG. 1.

FIG. 7 is a flowchart showing an example of a flow of whole processes of the first image forming apparatus 110-1 performed by the CPU 120.

First, initialization is performed at #1. Here, initialization of various kinds of data of the program is performed and an initial screen is displayed on the display 112 when the system is started.

At #2, it is determined whether there is a storing or reading request from the operation unit 111 or not. When the request exists, the operation is moved to #7 to perform an image input/output processing in the first image forming apparatus 110-1. More specifically, in a case of a copying request, the image is inputted by the scanner 113 and the readout image is outputted to the printer 114. In addition, when the printer 114 outputs the image, in the case of the above-described anti-counterfeit added document 182, combination of the anti-counterfeit pattern is instructed at the time of the output request to the printer 114, and then the combining operation is performed in the printer 114.

When the storing or reading request is not made from the operation unit 111 at #2, the operation is moved to #3. At #3, it is determined whether there are reading requests of the image data 180 stored in the first image forming apparatus 110-1 from the other devices 110-2 and 131 connected to the network 140 to the first image forming apparatus 110-1. The reading request includes a reading request from the second image forming apparatus 110-2 and a reading request from the personal computer 131.

When the reading requests from the other devices are recognized at #3, a transfer file list referring process is performed at #5 and a transfer file selecting process is performed at #6. Subroutines of these processes will be described below.

Meanwhile, when there is no reading request at #3, the operation is moved to #4. It is determined whether there are storing requests of the image data 180 from the other devices 110-2 and 131 to the first image forming apparatus 110-1 or not at #4. More specifically, it corresponds to a storing request of the image data (print data) to be printed from the personal computer 131.

When the storing requests from the other devices are recognized at #4, since it is necessary to receive data transmitted from the other devices and input it as the image, the operation is moved to #7. A storing operation of the data to be performed at #7 will be described below with reference to FIG. 12. Meanwhile, when there is no storing request at #4, since it is not necessary to perform the image input/output process, the operation is returned to #2 and the above processes are repeated.

Figure 8:
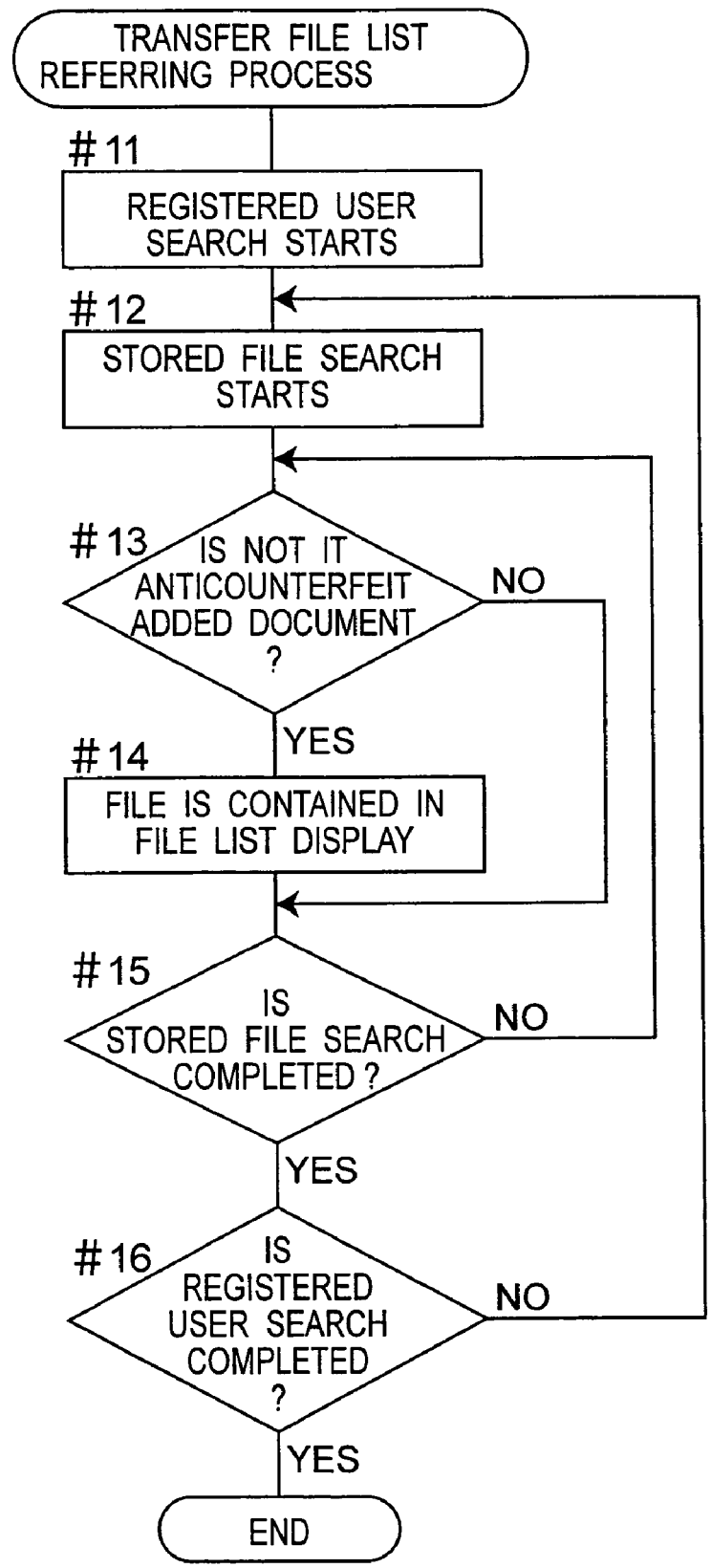
FIG. 8 is a flowchart to explain an operation of #5 shown in FIG. 7.

The transfer file list referring process at #5 will be described with reference to FIG. 8.

In this subroutine, it is determined whether the file 6 stored in the hard disk 123H of the first image forming apparatus 110-1 is the anti-counterfeit added document 182 or not, and when the file 6 is the anti-counterfeit added document 182, a process for prohibiting the browses from the second image forming apparatus 110-2 and the personal computer 131 is performed.

First, regarding the file 6 which is requested to be read, a searching process for a user registered in the first image forming apparatus 110-1 is executed at #11. Then, regarding the searched registered user, the file 6 stored in the first image forming apparatus 110-1 is searched at #12. Then, it is determined whether the searched file 6 is the anti-counterfeit added document 182 or not at #13. The determination is made based on the file attribute 63 shown in FIG. 5 in the treatment permission/non-permission determining unit 1202 in the CPU 120. Then, when it is determined that the searched file 6 is not the anti-counterfeit added document 182, that is, the searched file 6 is the general document 183, or the general image data 183, the searched file 6 is contained in the file list display and stored in the data storing unit 123 by the treatment permission/non-permission determining unit 1202 (#14). On the other hand, when it is determined that the searched file 6 is the anti-counterfeit added document 182, that is, the attribution information added image data 182, the searched file 6 is not contained in the file list display. These processes are performed for whole files of the registered users (#15 and #16). Then, only the files 6 classified in the file list display can be browsed from the other devices.

Thus, it can be determined whether the files can be browsed from the other devices or not only by classifying the general document 183 and the anti-counterfeit added document 182. Therefore, security regarding the treatment of the file 6 can be easily improved without damaging operability.

Figure 9:
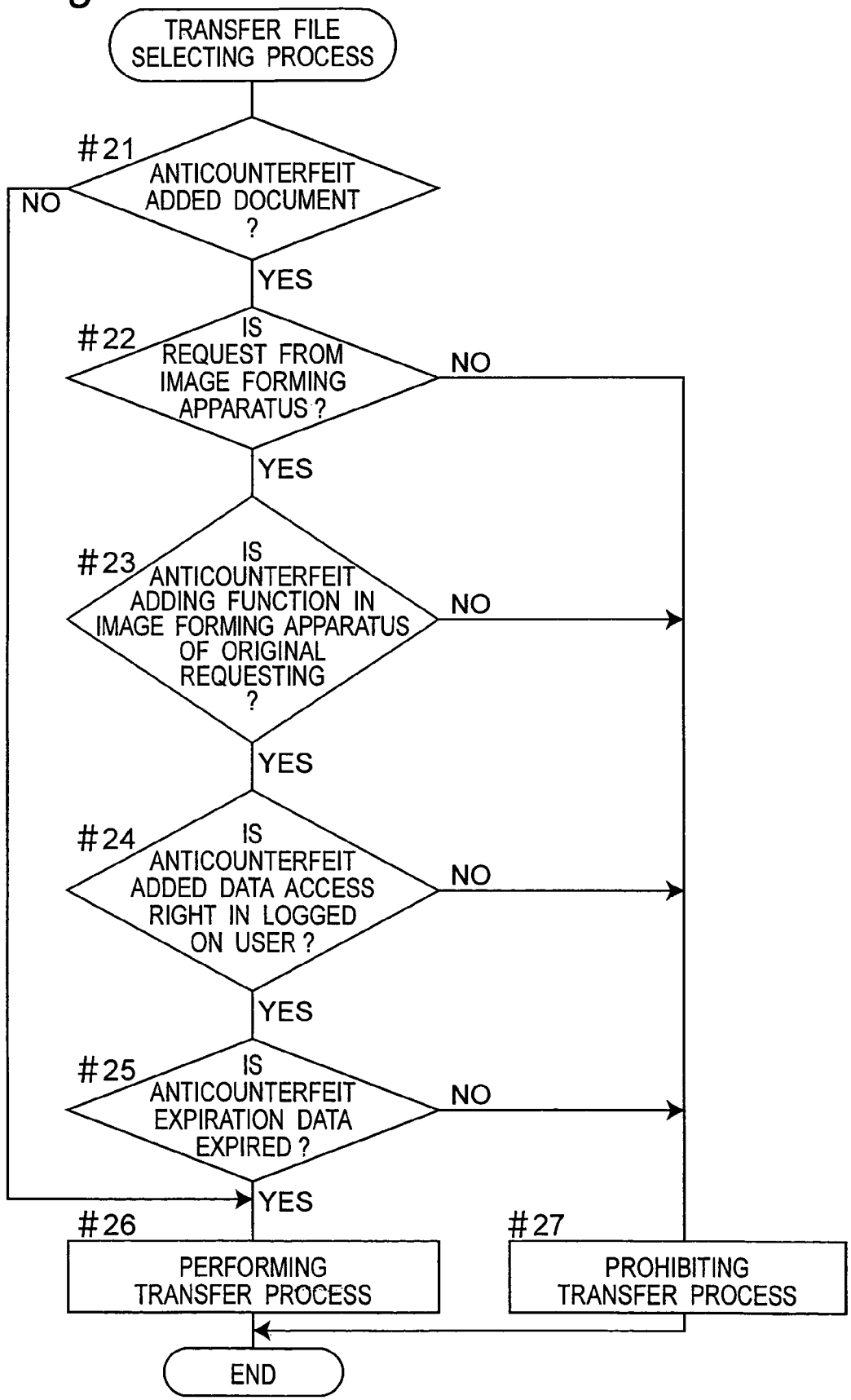
FIG. 9 is a flowchart to explain an operation of #6 shown in FIG. 7.

Next, the transfer file selecting process at #6 will be described with reference to FIG. 9.

In this subroutine, it is determined whether a file selected from the file 6 stored in the hard disk 123H of the first image forming apparatus 110-1 is the anti-counterfeit added document 182 or not, and when the selected file is the anti-counterfeit added document 182, it is determined whether treatment of the selected file 6 is permitted or not, for example, the transfer process of the selected file 6 is permitted or not by depending on the kind and function of the device which requests an access to the file 6, a state of the access authorization 73 to the anti-counterfeit added document 182, and the anti-counterfeit expiration date 64.

First, it is determined whether the selected file 6 is the anti-counterfeit added document 182 or not at #21. The determination is made based on the file attribute 63 in the treatment permission/non-permission determining unit 1202 in the CPU 120 as described above. When the selected file 6 is not the anti-counterfeit added document 182, that is, it is the general document 183, the operation is moved to #26 unconditionally and the file 6 is transferred from the first image forming apparatus 110-1 to the other device. Meanwhile, when the selected file 6 is the anti-counterfeit added document 182, the operation is moved to #22 and it is determined whether the access request to the file 6 is from the second image forming apparatus 110-2 or not. The determining operation is performed by the treatment permission/non-permission determining unit 1202, more specifically by the device discriminating unit 1203 in the CPU 120. A concrete determining method will be described below.

When the request is not from the second image forming apparatus 110-2, since it is determined that the request is from the personal computer 131, the transfer process is prohibited.

Meanwhile, when it is determined that the access request is from the second image forming apparatus 110-2 at #22, the operation is moved to #23 and it is determined whether the second image forming apparatus 110-2 has the anti-counterfeit information adding function 1141 or not. The information adding function 1141 is a function which can display the image attribute information 181 visibly onto the anti-counterfeit added document 182 when the anti-counterfeit added document 182 is outputted in the printer 114 of the second image forming apparatus 110-2. If the printer 114 of the second image forming apparatus 110-2 does not have the information adding function 1141, since the anti-counterfeit data, that is, the image attribute information 181 cannot be added to the image data 180 to be displayed and printed, the anti-counterfeit added document 182, that is, the attribute information added image data 182 is prohibited from being transferred from the first image forming apparatus 110-1 to the second image forming apparatus 110-2.

Meanwhile, when it is determined that the information adding function 1141 is provided in the printer of the second image forming apparatus 110-2 at #23, the operation is moved to #24. In #24, it is determined whether the user who logged in to the second image forming apparatus 110-2 which requests the access has the anti-counterfeit added data access authorization 73 or not. The determination is made by the treatment permission/non-permission determining unit 1202 in the CPU 120 based on the permission/non-permission information of the access authorization 73 in the user information database 7 shown in FIG. 6.

When it is determined that the access authorization 73 has been given to the user at #24, the operation is moved to #25. In #25, it is determined whether the present date is within the anti-counterfeit expiration date 64 or not. The determination is made by the treatment permission/non-permission determining unit 1202 in the CPU 120 based on the information of the anti-counterfeit expiration date 64 shown in FIG. 5.

Then, when it is determined that the present date is within the anti-counterfeit expiration date 64 at #25, the treatment permission/non-permission determining unit 1202 in the CPU 120 determines that transfer conditions of the anti-counterfeit added document 182 to the second image forming apparatus 110-2 are all established, and then the operation is moved to #26. Then, the anti-counterfeit added document 182 is transferred from the first image forming apparatus 110-1 to the second image forming apparatus 110-2. In addition, if any one of conditions in the processes at #22 to #25 is not established, the operation is moved to #27 and the above transfer process is prohibited.

As described above, when there is an access request to the anti-counterfeit added document 182 stored in the first image forming apparatus 110-1 from the other device of the network 140, only when the plurality of permission conditions are accomplished, the treatment of the anti-counterfeit added document 182 between the first image forming apparatus 110-1 and the second image forming apparatus 110-2 is permitted. Therefore, the security of the anti-counterfeit added document 182 can be more improved than before.

A concrete determining method whether the access request to the file 6 is from the second image forming apparatus 110-2 or not at #22 will be described hereinafter.

Figure 10:
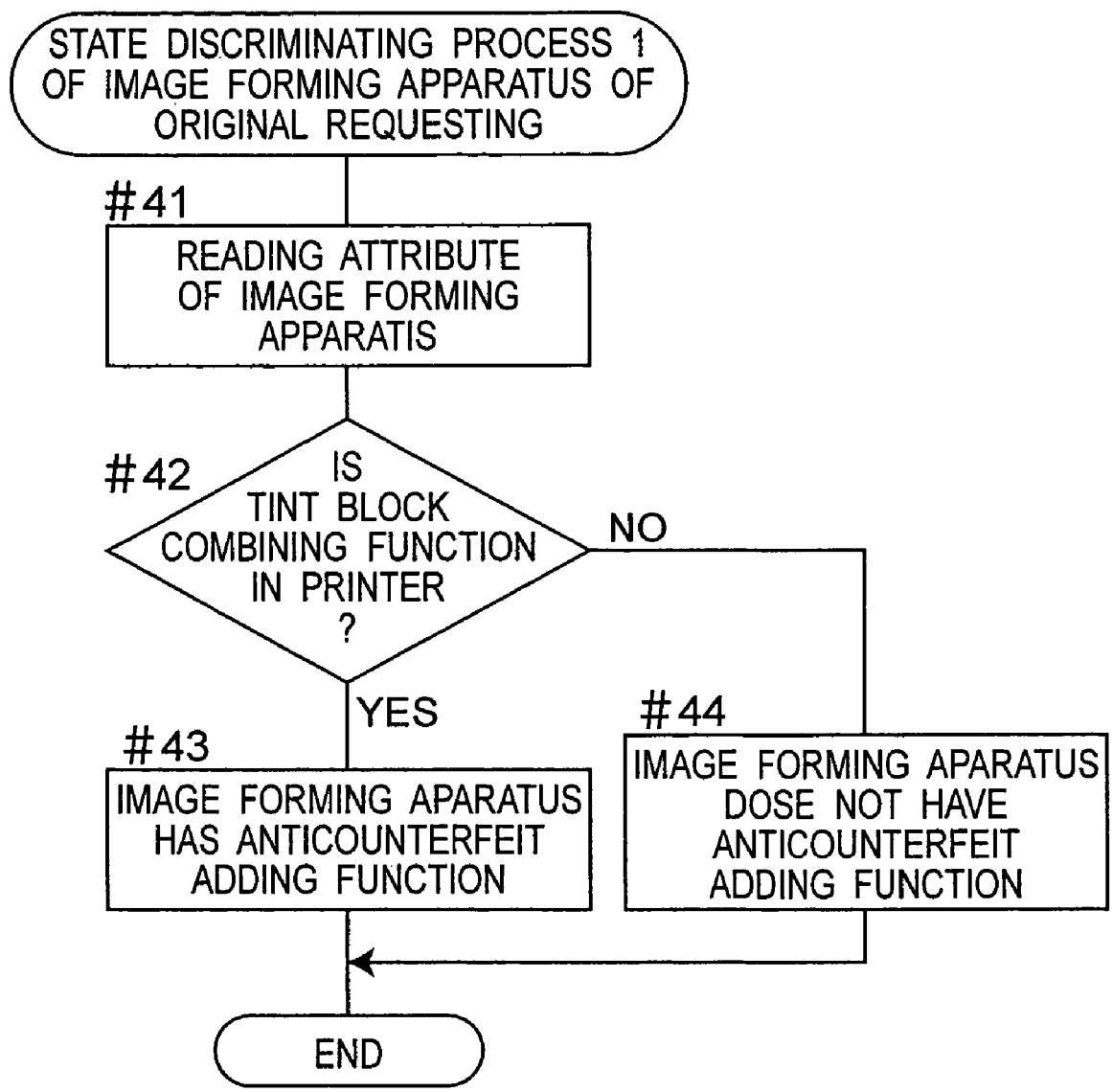
FIG. 10 is a flowchart to explain an example of a process operation at #22 shown in FIG. 9.

FIG. 10 shows an example of the above determining method.

At #41, the first image forming apparatus 110-1 reads a device attribute information of the second image forming apparatus 110-2 from the second image forming apparatus 110-2 which requires the access. As shown in FIG. 1, the device attribute information 185 is stored, for example, in the ROM 122 in each device, and can be read and transmitted by a control unit (CPU) of each device. In addition, the device attribute information 185 is previously transmitted from the second image forming apparatus 110-2 to the first image forming apparatus 110-1 when there is an access request of the image data 180 from the second image forming apparatus 110-2 to the first image forming apparatus 110-1. In this embodiment, the device attribute information 185 includes information 1851 about whether there is the information adding function 1141, that is, a tint block combining function in the printer 114 installed in the second image forming apparatus 110-2 or not, a manufacturer ID 1852 of the second image forming apparatus 110-2, and a manufacturer-specific device type ID 1853 of the second image forming apparatus 110-2.

At #42, it is determined whether the information adding function 1141 is provided in the printer 114 in the second image forming apparatus 110-2 or not on the basis of the information 1851 for the presence or absence of the information adding function 1141 included in the device attribute information 185 read from the second image forming apparatus 110-2. The determination is made by the CPU 120, especially the device discriminating unit 1203. In the result of the determination, when the information adding function 1141 is provided in the printer 114 of the second image forming apparatus 110-2, it is determined that the printer 114 of the second image forming apparatus 110-2 has the information adding function at #43. Meanwhile, when the information adding function 1141 is not provided, it is determined that the printer 114 of the second image forming apparatus 110-2 does not have the information adding function at #44.

Figure 11:
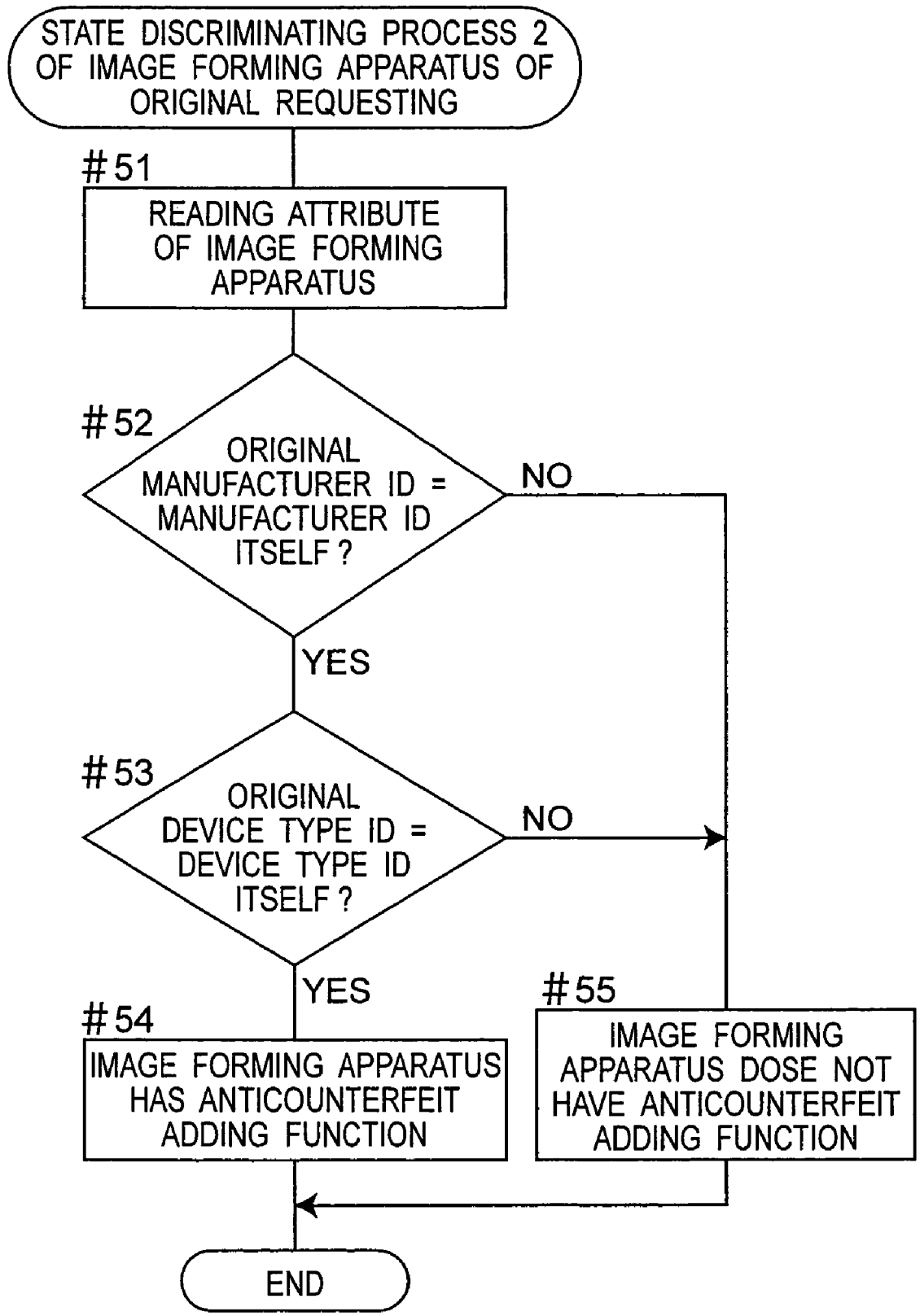
FIG. 11 is a flowchart to explain another example of the process operation at #22 shown in FIG. 9.

In addition, FIG. 11 shows another example of the method determining whether the access request to the file 6 is from the second image forming apparatus 110-2 or not at #22.

At #51, similar to the description at #41, the first image forming apparatus 110-1 reads out the device attribute information 185 of the second image forming apparatus 110-2 from the second image forming apparatus 110-2 which requests the access.

At #52, the first image forming apparatus 110-1 compares the manufacturer ID 1852 of the second image forming apparatus 110-2, the manufacturer ID 1852 being included in the device attribute information 185 read from the second image forming apparatus 110-2, with the manufacturer ID 1852 of the first image forming apparatus 110-1 itself. Then when both manufacturer IDs coincide with each other, the operation is moved to #53.

At #53, the first image forming apparatus 110-1 compares the device type ID 1853 of the second image forming apparatus 110-2, the device type ID 1853 being included in the device attribute information 185 and being a specific number in the manufacturer of the second image forming apparatus 110-2, with the device type ID 1853 of the first image forming apparatus 110-1 itself. Then when both device type IDs coincide with each other, the operation is moved to #54.

At #54, since the manufacturer ID 1852 and the device type ID 1853 of the second image forming apparatus 110-2 coincide with those of the first image forming apparatus 110-1, that is, since the manufacturers of the first image forming apparatus 110-1 and the second image forming apparatus 110-2 are the same, and the apparatus 110-1 and 110-2 are the same device, the first image forming apparatus 110-1 determines that the printer 114 of the second image forming apparatus 110-2 has the information adding function. Thus, in this case, the attribute information added image data 182 is permitted to be transferred from the first image forming apparatus 110-1 to the second image forming apparatus 110-2.

On the other hand, when it is determined that the manufacturer ID 1852 of the second image forming apparatus 110-2 does not coincide with that of the first image forming apparatus 110-1 and further both of the device type IDs 1853 do not coincide with each other at #52 and #53, the first image forming apparatus 110-1 determines that there is no information adding function 1141 in the printer 114 in the second image forming apparatus 110-2 at #55. Therefore, in this case, the transference of the attribute information added image data 182 form the first image forming apparatus 110-1 to the second image forming apparatus 110-2 is not permitted.

As described above, according to the method shown in FIG. 11, since the number of the determining conditions for permitting the treatment of the attribute information added image data 182 is increased as compared with the case shown in FIG. 10, the security of the attribute information added image data 182 can be further improved.

Figure 12:
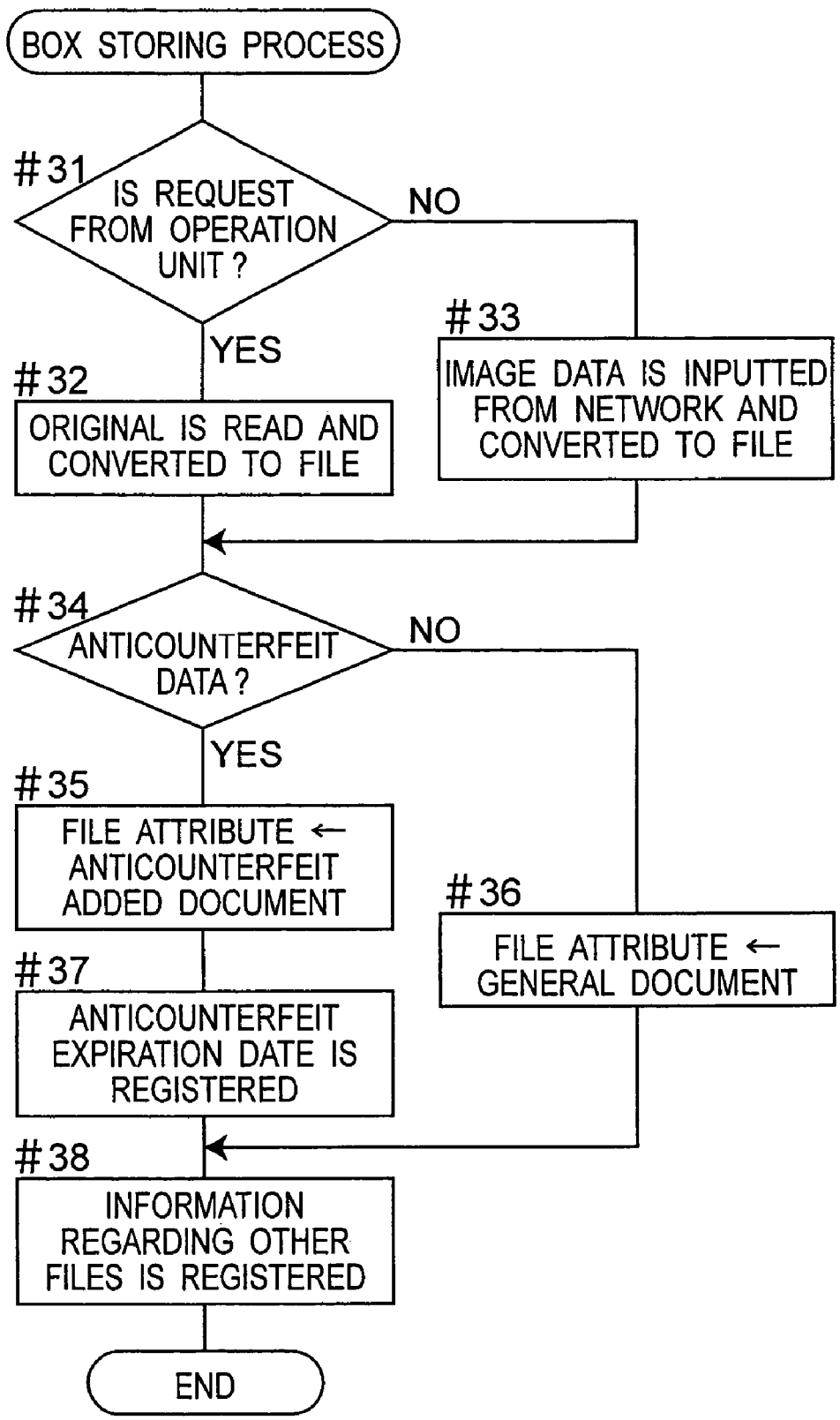
FIG. 12 is a flowchart to explain a case where image data is stored in a process at #7 shown in FIG. 7.

Next, an operation when there is a storing request of the image data 180 in the image input/output process at #7 shown in FIG. 7 will be described with reference to FIG. 12.

First, it is determined whether the storing request of the image data 180 is from the operation unit 111 of the first image forming apparatus 110-1 or not at #31. When the request is from the operation unit 111, the original set by the user is read at #32 and the image data 180 of the original is converted to the file 6 as described above. On the other hand, when the request is not from the operation unit 111, since the request is from the other device on the network 140, the image data is inputted from the other device and is converted to the file at #33.

At #34, it is determined whether the image data 180 converted to the file 6 is the attribute information added image data 182 or not. When the storing request is from the operation unit 111, the operator previously instructs the addition of the image attribute information 181 before the original is read, so that the determination is made. When the storing request is from the other device, the information to the effect that is transmitted before the transference of the image data 180 from the other device, so that the determination is made.

When it is determined that the image data 180 is the attribute information added image data 182 at #34, the operation moves to #35. Then the file 6 of the image data 180 is registered as the "anti-counterfeit added document" 182 in the file attribute 63 shown in FIG. 5, and at #37, the anticounterfeit expiration date 64 is registered. The anti-counterfeit expiration date 64 is set before the image is inputted only when the image data 180 is the attribute information added image data 182.

On the other hand, when it is determined that the image data 180 is not the attribute information added image data 182 at #34, the operation moves to #36. Then the file 6 of the image data 180 is registered as the "general document" 183 in the file attribute 63 shown in FIG. 5.

The other information regarding the file is registered at #38.

In addition, according to the above embodiment, the description has been made such that when the user selects that the image data 180 is set as the attribute information added image data 182, the image attribute information 181 is added to the image data 180 when the image data 180 is formed in the scanner 113. However, the present invention is not limited to the above and the image attribute information 181 may be added when the image data 180 is stored in the box 5 as the file 6. In short, the addition only has to be completed until the access request to the image data 180 is made.

The present invention is applied to the image forming apparatus connected to the network and has the function to add the anti-counterfeit information, for example, and it can be also applied to the image forming apparatus in which the image data to which the anti-counterfeit information is added can be prohibited from being transferred to the other image forming apparatus, the image management method and the image management program performed by that image forming apparatus.

It is to be noted that, by properly combining the arbitrary embodiments of the aforementioned various embodiments, the effects possessed by them can be produced.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A first image forming apparatus connected to a network, which comprises:
   an information adding unit configured to add image attribute information corresponding to a pattern image formed on a recording sheet for anti-counterfeit to image data and form attribute information added image data when addition of the image attribute information to the image data is selected;
   a data storing unit configured to store the attribute information added image data and image data which does not have the image attribute information; and
   a treatment permission/non-permission determining unit configured to determine whether treatment of the image data for a second image forming apparatus connected to the first image forming apparatus through the network is permitted or not based on whether the image data is the attribute information added image data or not and whether the second image forming apparatus has an ability to form the pattern image on the recording sheet or not,
   wherein when the second image forming apparatus requests the treatment of the attribute information added image data, the treatment permission/non-permission determining unit does not permit the treatment of the attribute information added image data in the case that the second image forming apparatus does not have the ability, and permits the treatment of the attribute information added image data in the case the second image forming apparatus has the ability.

2. The image forming apparatus according to claim 1, further comprising a storing unit configured to classify the image data into the attribute information added image data and general image data in which the attribute information added image data is not added and store the attribute information added image data and general image data; wherein the treatment permission/non-permission determining unit determines whether the treatment is permitted or not depending on the classification.

3. The image forming apparatus according to claim 2, wherein the storing unit further includes an access right storing unit configured to store an access right showing permission or non-permission of access to the attribute information added image data every user.

4. The image forming apparatus according to claim 3, wherein the storing unit further includes a time limit storing unit configured to store a non-permission time limit in which the access to the attribute information added image data is not permitted every attribute information added image data.

5. The image forming apparatus according to claim 1, wherein the device discriminating unit includes an ID determining unit configured to determine whether a manufacturer ID and a device type ID of the first image forming apparatus coincide with an manufacturer ID and a device type ID of the second image forming apparatus, respectively or not, and the treatment permission/non-permission determining unit determines whether the treatment is permitted or not depending on the coincidence or non-coincidence of the IDs.

6. The image forming apparatus according to claim 1, wherein whether the treatment of the attribute information added image data in the treatment permission/non-permission determining unit is permitted or not corresponds to whether transference of the attribute information added image data from the first image forming apparatus to the other device is permitted or not.

7. The image forming apparatus according to claim 1, wherein whether the treatment of the attribute information added image data in the treatment permission/non-permission determining unit is permitted or not corresponds to whether browse of the attribute information added image data in the first image forming apparatus from the other device is permitted or not.

8. The image forming apparatus according to claim 1, wherein the image attribute information is anti-counterfeit information of the image data.

9. An image management method of a first image forming apparatus comprising:
   forming image data;
   forming attribute information added image data by adding image attribute information corresponding to a pattern image formed on a recording sheet for anti-counterfeit to the image data when addition of the image attribute information to the image data is selected;
   storing the attribute information added image data and image data which does not have the image attribute information; and
   determining whether treatment of the image data for a second image forming apparatus connected to the first image forming apparatus through the network is permitted or not based on whether the image data is the attribute information added image data or not and whether the second image forming apparatus has an ability to form the pattern image on the recording sheet or not, wherein when the second image forming apparatus requests the treatment of the attribute information added image data, the treatment of the attribute information added image data is not permitted in the case that the second image forming apparatus does not have the ability, and permits the treatment of the attribute information added image data in the case the second image forming apparatus has the ability.

10. The image management method according to claim 9, comprising determining whether access to the attribute information added image data is permitted or not and determining whether a non-permission time limit in which the access to the attribute information added image data is not permitted expires or not when it is determined whether the treatment of the attribute information added image data is permitted or not.

11. The image management method according to claim 9, in which it is determined whether the attribute information added image data can be formed by the second image forming apparatus or not depending on whether a manufacturer ID and a device type ID of the first image forming apparatus coincide with a manufacturer ID and a device type ID of the second image forming apparatus, respectively or not.

12. The image management method according to claim 9, wherein the image attribute information is anti-counterfeit information of the image data.

13. The image forming apparatus according to claim 1, wherein when the second image forming apparatus requests the treatment of the image data which does not have the image attribute information, the treatment permission/non-permission determining unit permits the treatment of the image data for the second image forming apparatus.

14. The image forming apparatus according to claim 1, wherein the treatment permission/non-permission determining unit includes a detecting unit to detect whether the second image forming apparatus has an information corresponding to the ability.

15. The image management method according to claim 9, wherein the determining step includes a detecting step to detect whether the second image forming apparatus has an information corresponding to the ability.

16. The image forming apparatus according to claim 1, wherein the pattern image includes at least one of an embedded pattern and a tint block pattern.

17. The image management method according to claim 9, wherein the pattern image includes at least one of an embedded pattern and a tint block pattern.

18. The image forming apparatus according to claim 1, wherein the pattern image comprises a latent image which cannot be recognized with eyes.

19. The image forming apparatus according to claim 18, wherein the pattern image comprises the latent image and tint block pattern having almost the same level of concentrations.

* * * * *